3,291,641
METHOD OF MAKING DRY-CHARGED LEAD-ACID BATTERY ELEMENTS BY TREATING THE ASSEMBLED BATTERY
Ahmad Sam, Circle Pines, Minn., assignor to Gould-National Batteries, Inc., a corporation of Delaware
No Drawing. Filed Aug. 8, 1963, Ser. No. 300,931
8 Claims. (Cl. 136—27)

This invention relates generally to lead-acid storage batteries and in particular to improvements in the preparation of dry-charged negative electrodes for batteries of this type.

In the highly competitive battery industry, attention is constantly being directed toward improvements in construction techniques for effecting high reliability and long operational life in relatively large capacity batteries while maintaining production costs at a minimum. One of the difficulties encountered in the past has been the tendency of the dry-charged negative plates used in lead-acid batteries to oxidize after formation with resulting loss of capacity, diminished operational reliability and reduced life expectancy. The oxidation has principally resulted from the exposure of the formed negative plate to moist air during subsequent storage and use of the negative plates after they have been formed and dried. As a result of the oxidation, the spongy lead of the negative plates oxidizes to PbO, whereas the positive active material remains unaffected. This reaction, being quite slow in dry air of low or moderate temperature, is expedited by heat and the catalytic action of the moisture in the air. Consequently, a fresh, dry-charged element, after storage for 24 hours at 100° F. and 100% humidity, will lose on the average about two thirds of its capacity available for starting an automobile (150 a. for 12 volt and 300 a. for 6 volt batteries).

When a dry-charged element with partially oxidized negative plates comes into contact with sulfuric acid solution, the lead oxide reacts with sulfuric acid resulting in lead sulfate. Such a battery cell should be charged, preferably at a low rate for some time, to convert the lead sulfate back to lead.

In order to have dry-charged batteries retain their capacity on storage, the charged plates should be kept in a dry state and in a low humidity atmosphere. Since the containers generally are not gas tight, when dry charged batteries are exposed to moist air, oxygen and water vapor can get in the containers and oxidize the negative active materials in spite of the care taken to ensure that all the parts of the battery are kept well dried.

It is a general object of this invention to provide a negative plate which is substantially non-oxidized when subjected to moist air.

It is a further object of this invention to improve the life expectancy of lead-acid storage batteries under normal use conditions.

Still a further object of this invention is to achieve the foregoing objects with no substantial loss in the capacity of the negative plate.

Yet another object of this invention is to achieve the foregoing objects in a relatively economical manner.

In the past, the negative and positive plates have been formed by assembling the basic elements along with the appropriate separators as a unit and then subjecting this unit to the proper treatment to form the active materials on the electrodes. The unit would then be disassembled and the negative plate separately subjected to further treatment before drying to prevent the previously described loss of capacity due to oxidation. As a feature of this invention the entire unit, consisting of the formed negative and positive plates along with the separators, is subject to the treatment contemplated by this invention with no harmful effects to the positive plate or the separator while still effecting the desired protection of the negative plate. This, of course, results in time saving and reduced handling during the assembly of the plates with the accompanying reduction in the cost of fabrication and reduction in the likelihood of damage during handling while still achieving the desired protective features.

In the practice of this invention, the initial formation of the negative and positive battery plates is common to each of the different processes contemplated by the teachings of this invention. This initial formation is well known in the art and, briefly, comprises the following steps. A suitable base of active material, generally in paste form, is placed on the respective support structures for the positive and negative plates. These support structures are generally a porous mesh of electrically conductive material. The negative and positive electrodes along with suitable separators are then assembled as a unit and immersed in a suitable electrolyte and subjected to a charging process which results in proper active material being formed on the plates. The entire assembled unit is then washed in a suitable bath to remove excess electrolyte and any loose active material. Past practice has been that in the next step the negative plate is dried by being subjected to a hot, drying inert gas. In the event air is used in the drying step, there may be a small degree of oxidation of the negative plate but this is generally negligible. As hereafter described, the improvement taught by this invention prevents any substantial oxidation during subsequent storage or use by subjecting the assembly to further treatment prior to drying.

In one module of practice of this invention, after the assembled unit has been washed and prior to drying, it is immersed in a treating solution of 1% to 10% maleic acid in water for a period of time ranging in the order of a few seconds to ten minutes at room temperature. The treating solution at least partially impregnates the active material on the negative plate and has substantially no effect on the positive plate or the separators. The entire unit is then dried in hot dry air or inert gas at a temperature ranging from 280° to 290° F. for five to seven minutes bringing the final temperature of the elements to 240° to 250° F. During this drying step substantially no oxidation of the negative plate takes place. It should be particularly noted that the treating solution is not harmful to the positive electrode or the separators and, therefore, the negative plate is not subjected to excessive handling by disassembly.

It has been found that prolonged exposure of the plate to the maleic acid solution, exceeding approximately ten minutes, results in the formation of white crystalline material on the negative and positive active materials with a resulting discharge of the plates. Additionally, if the solution contains more than 10% maleic acid, subsequent drying by heat causes a speedy reaction between the maleic acid and the positive active material. Consequently, when such plates are exposed to air after drying the reaction of the heated positive plates with the maleic acid causes spontaneous combustion of separators, melting of the supporting structures and general deterioration of the plates.

The solutions of maleic acid have been made also by dissolving maleic anhydride, C.P. grade, manufactured by Monsanto Chemical Corp., in water. Maleic anhydride, when dissolved, reacts slowly with water and forms maleic acid. It has been found that solutions of maleic anhydride in water, having the same concentration as maleic acid within the required range stated above, has the same effect on the dry-charged plates as the maleic acid.

Test results on elements treated with maleic acid solutions according to the teachings of this invention are shown in Table 1.

TABLE 1

| Exposure | Control Capacity, Amp.-Hrs. | | | | 1% Maleic Acid Capacity, Amp.-Hrs. | | | |
|---|---|---|---|---|---|---|---|---|
| | 1st Dis. | 2d Dis. | 3d Dis. | Percent Lead | 1st Dis. | 2d Dis. | 3d Dis. | Percent Lead |
| Room Atmosphere | 12.82 | 16.45 | 17.32 | 90.4 | 12.02 | 17.10 | 18.05 | 89.7 |
| H.B., 24 Hrs | 4.16 | 16.40 | 15.00 | 70.1 | 9.40 | 17.75 | 17.15 | 71.4 |
| H.B., 48 Hrs | 0.00 | 16.70 | 15.65 | 55.8 | 0.00 | 17.25 | 16.10 | 54.6 |
| H.B., 72 Hrs | 0.00 | 14.65 | 16.50 | 50.2 | 0.00 | 16.90 | 17.50 | 53.4 |
| H.B., 96 Hrs | 0.00 | 17.10 | 17.65 | 38.6 | 0.00 | 16.50 | 16.90 | 51.4 |

| Exposure | 5% Maleic Acid Capacity, Amp.-Hrs. | | | | 10% Maleic Acid Capacity, Amp.-Hrs. | | | |
|---|---|---|---|---|---|---|---|---|
| | 1st Dis. | 2d Dis. | 3d Dis. | Percent Lead | 1st Dis. | 2d Dis. | 3d Dis. | Percent Lead |
| Room Atmosphere | 11.68 | 17.75 | 18.46 | 90.6 | 9.58 | 16.58 | 17.46 | 90.4 |
| H.B., 24 Hrs | 11.08 | 17.60 | 16.78 | 74.9 | 10.2 | 17.60 | 16.25 | 88.9 |
| H.B., 48 Hrs | 3.19 | 17.2 | 16.55 | 66.4 | 11.05 | 17.10 | 16.65 | 83.1 |
| H.B., 72 Hrs | 1.04 | 16.63 | 17.08 | 54.40 | 7.70 | 16.35 | 16.85 | 82.0 |
| H.B., 96 Hrs | 0.78 | 17.10 | 17.42 | 60.4 | 6.67 | 16.50 | 16.90 | 81.9 |

The table lists the ampere-hour capacity and the percent of free lead in the negative material after discharge during three charge-discharge cycles with the elements subjected to five different conditions of humidity. The test results were obtained in the following manner.

A number of 50 ampere-hour, 12-volt elements of dry-charged batteries formed in 1.080 specific gravity sulfuric acid were randomly selected and washed with water until the wash solution was no longer acidic. Then, they were randomly divided into four groups. The first three groups were respectively immersed for approximately ten minutes each in solutions containing 1%, 5% and 10% by weight of maleic acid in water, to which wetting agent had been added in the same ratio as for the treatment of ordinary dry-changed plates prior to drying (2.3 ml. of wetting agent per liter of solution). The fourth group was chosen as control and was treated only with wetting agent in water. All the elements were dried in an inert gas at the prescribed temperature immediately after the treatment. These elements, after being kept at room atmosphere or in a humidity box of 100° F. and 100% humidity, were discharged at room temperature in 1,250 specific gravity sulfuric acid solutions at 150 amps. after allowing 20 minute soak in the acid for activation. Samples of the negative active material from both control and test cells were taken out for free lead determination before the plates were exposed to $H_2SO_4$ solutions. In Table 1 the discharge capacity of the cells for three charge-discharge cycles, and the percentage of free lead in the negative active material are listed. In each cycle the cell was discharged at 150 amps. to a cut-off voltage of 1.00 volt per cell followed by a charge at 5.0 amps. for several hours to full charge.

A review of Table 1 shows that maleic acid treated elements have a slightly lower capacity when they are fresh, but they are much more moisture resistant than the control elements.

The elements treated with 10% solutions of maleic acid show the highest moisture resistance property. The slightly lower capacity of the maleic acid treated elements is considered to be due to the effect of maleic acid on the positive elements when these elements are heated for drying. When the treated elements were washed with water prior to drying to wash off excess maleic acid, as described below, dry charged plates with more capacity were obtained.

Solutions of 5% and 10% maleic acid were made in water containing wetting agent. Formed elements of 50 ampere-hour, 12-volt dry charged batteries were immersed in these solutions for ten minutes after they were washed with water to remove the sulfuric acid from the plates. Then, they were taken out and again immersed in water for ten minutes and dried in an inert gas drier at the prescribed temperature. The elements for the control batteries were only treated with wetting agent prior to drying. Two batteries were made with each species of the elements, one stored in the humidity box (100° F. and 100% humidity) for 48 hours and the other for 120 hours. These batteries were then cooled to 30° F., activated with 1.250 specific gravity sulfuric acid at 30° F. and discharged to 9.00 volt after being charged at 30 a. for 10 minutes several times. Data concerning the capacity of these batteries is shown in Table 2.

TABLE 2

| Basis For Comparison | In H.B. For 48 Hours | | |
|---|---|---|---|
| | Control | 5% Maleic | 10% Maleic |
| After 5 min. soak, 5 sec. dis. at 150 a | 0.82 | 0.90 | 0.83 |
| After 10 min. soak, 5 sec. dis. at 150 a | 0.68 | 1.10 | 1.00 |
| Charged 10 min. at 30 a., 5 sec. dis. at 150 a | 2.00 | 8.60 | 9.10 |
| Minutes delivered to 9.00 v | 0.00 | 0.00 | 1.27 |
| Charged 10 min. at 30 a., 5 sec. dis. at 150 a | 9.98 | 10.56 | 10.40 |
| Minutes delivered to 9.00 v | 0.43 | 4.30 | 3.90 |
| Charged 10 min. at 30 a., placed in 0° F. cold box for 24 hours: | | | |
| 5 second disch. at 150 a | 9.38 | 9.18 | 9.23 |
| Minutes delivered to 9.00 v | 1.30 | 0.67 | 0.78 |
| Charged 10 min. at 30 a., 5 sec. dis. at 150 a | 10.40 | 10.20 | 10.19 |
| Minutes delivered to 9.00 v | 2.62 | 1.18 | 1.08 |
| Total minutes delivered | 4.35 | 6.15 | 7.03 |
| Percentage of free lead | 62.8 | 77.5 | 84.5 |

| Basis For Comparison | In H.B. For 120 Hours | | |
|---|---|---|---|
| | Control | 5% Maleic | 10% Maleic |
| After 5 min. soak, 5 sec. dis. at 150 a | 0.40 | 0.72 | 0.75 |
| After 10 min. soak, 5 sec. dis. at 150 a | 0.65 | 0.75 | 0.75 |
| Charged 10 min. at 30 a., 5 sec. dis. at 150 a | 1.00 | 1.70 | 6.35 |
| Minutes delivered to 9.00 v | 0.00 | 0.00 | 0.00 |
| Charged 10 min. at 30 a., 5 sec. dis. at 150 a | 1.70 | 10.00 | 10.60 |
| Minutes delivered to 9.00 v | 0.00 | 0.30 | 2.73 |
| Charged 10 min. at 30 a., placed in 0° F. cold box for 24 hours: | | | |
| 5 second dis. at 150 a | 9.00 | 9.24 | 9.20 |
| Minutes delivered to 9.00 v | 0.17 | 0.80 | 1.58 |
| Charged 10 min. at 30 a., 5 sec. dis. at 150 a | 10.25 | 10.21 | 10.08 |
| Minutes delivered to 9.00 v | 1.68 | 1.98 | 1.02 |
| Total minutes delivered | 1.85 | 3.08 | 5.33 |
| Percentage of free lead | 47.5 | 66.7 | 72.7 |

The data in Table 2 shows that:

(1) Treated batteries have a higher voltage under charge than the control batteries after ten minutes soak, the first and the second ten minute charge. Those having elements treated with 10% solution of maleic acid are considerably better.

(2) The total minute discharge is much higher for the batteries having treated elements and a higher fraction of the capacity is available at the early stage of the discharge for the treated batteries compared to the untreated control batteries. Those having elements treated with 10% solution maleic acid are considerably better.

(3) The percentage of free lead is much higher for the treated batteries than for the untreated control batteries. In this case the batteries having the elements treated with 10% maleic acid are also the best.

It is suggested that the protective action of maleic acid is due to the existence of a carbon-carbon double bond in the formula of maleic acid. This acid probably forms a layer of a lead salt on the surface of the negative active material. This layer, being insoluble and anti-oxidant, because of the existence of carbon-carbon double bond in it, keeps the moisture off the negative active material and retards the oxidation of the negative plates.

A further mode of practice of this invention contemplates the use of two organic acids having carbon-carbon double bond. Solutions of 5% by weight of itaconic and acetylene dicarboxylic acid in water containing wetting agent were made. The latter is commercially available in the form of monopotassium salt of acetylene dicarboxylic acid. To the solution of this salt the required amount of $H_2SO_4$ was added to free the acid. Formed and washed dry charged plates were immersed in these solutions for ten minutes prior to drying. The capacity of cells having these treated plates at room atmosphere or in the humidity box (100° F. and 100% humidity) and the percentage of lead in the negative active material for three charge-discharge cycles as compared to a control cell are shown in Table 3.

TABLE 3

| Humidity | Control | | | |
|---|---|---|---|---|
| | Capacity, Amp.-Hrs. | | | |
| | 1st Disch. | 2d Disch. | 3d Disch. | Percent Lead |
| Room | 14.43 | 18.70 | 18.60 | 83.2 |
| In H.B., 24 Hours | 4.05 | 18.65 | 18.60 | 63.8 |
| | Treated With Itaconic Acid | | | |
| | Capacity, Amp.-Hrs. | | | |
| | 1st Disch. | 2d Disch. | 3d Disch. | Percent Lead |
| Room | 12.61 | 18.50 | 19.40 | 93.9 |
| In H.B., 24 Hours | 12.42 | 18.55 | 19.40 | 86.9 |
| | Treated With Acetylene Dicarboxylic Acid | | | |
| | Capacity, Amp.-Hrs. | | | |
| | 1st Disch. | 2d Disch. | 3d Disch. | Percent Lead |
| Room | 9.40 | 19.95 | 20.00 | 87.8 |
| In H.B., 24 Hours | 3.92 | 19.65 | 19.00 | 75.4 |

In each cycle the cell was discharged at 150 amps. to a cut-off voltage of 1.00 volts per cell followed by a charge at 5.0 amps. for several hours to full charge. A review of the data in Table 3 shows that lead percentage is higher for the treated cells compared to the control cells. The capacity in the first cycle is higher for the cell having plates treated with itaconic acid which was in the humidity box for 24 hours. The lower capacity in the first cycle and percentage of free lead for the cells with the plates treated with acetylene dicarboxylic acid as compared to those treated with itaconic acid, indicates poorer anti-oxidation properties of the latter and its salts resulting from the existence of a carbon to carbon triple bond in the formula of this compound. It should be noted, however, that the capacity of the cells treated with acetylene dicarboxylic acid is higher in the second and third cycles than the control cells and those treated with itaconic acid.

I claim:

1. In the process of preparing dry-charged electrodes for lead-acid storage batteries:
   (a) first, forming the active materials on the negative and positive plates while assembled together with separators as a unit assembly;
   (b) second, immersing the unit assembly in a treating solution of about 1% to 10% of an acid selected from the group consisting of maleic acid, itaconic acid and acetylene dicarboxylic in water;
   (c) and then drying the unit assembly in gas at a temperature of about 280° F. to 290° F. to bring the temperature of the assembly to about 240° to 250° F.

2. In the manufacture of dry-charged electrodes for lead-acid storage batteries wherein the active materials are formed on the positive and negative plates while assembled as a unit together with separators, the improvement comprising:
   (a) immersing the unit assembly after formation in a treating solution of water and 1% to 10% of an acid selected from the group consisting of maleic acid, itaconic acid and acetylene dicarboxylic for about ten minutes;
   (b) and then drying the unit assembly at a temperature of about 280° F. to 290° F. to bring the temperature of the unit to about 240° to 250° F.

3. In the manufacture of dry-charged elements for lead-acid storage batteries, the improvement comprising the steps of:
   (a) immersing a unit assembly of formed positive and negative electrodes and separators in a treating solution of a mixture of water and 1% to 10% of an acid selected from the group consisting of maleic acid, itaconic acid and acetylene dicarboxylic,
   (b) then drying the unit assembly in gas at a temperature of about 280° F. to 290° F. to bring the assembly temperature to the range of 240° F. to 250° F.

4. In the manufacture of dry-charged electrodes for lead-acid storage batteries wherein the active materials are formed on the positive and negative plates while assembled as a unit together with separators, the improvement comprising:
   (a) immersing the unit assembly in a treating solution consisting of water and 1% to 10% by weight of maleic acid for a period of time ranging up to about ten minutes;
   (b) then drying the unit assembly in gas.

5. The process of claim 4 wherein said gas is air.

6. The process of claim 4 wherein the unit assembly is dried in inert gas at a temperature in the range of 280° F. to 290° F. for a period of time to bring the temperature of the unit assembly to the range of 240° F. to 250° F.

7. In the manufacture of dry-charged elements for lead-acid storage batteries, the improvement comprising the steps of:
   (a) immersing a unit assembly of formed positive and negative electrodes and separators in a treating solution consisting of water and 1% to 10% by weight of maleic acid for a period of time ranging up to ten minutes;

(b) then drying the unit assembly in an inert gas at a temperature in the range of 280° F. to 290° F. for five to seven minutes.

8. The process as in claim 7 further including the step of: washing off excessive maleic acid solution from the unit assembly prior to drying.

References Cited by the Examiner

UNITED STATES PATENTS

| | | | |
|---|---|---|---|
| 2,747,008 | 5/1956 | Sundberg et al. | 136—27 X |
| 2,894,864 | 7/1959 | Ek et al. | 117—134 X |
| 2,976,179 | 3/1961 | Westlund et al. | 117—134 X |
| 2,996,563 | 8/1961 | Haebler | 136—27 |
| 3,198,665 | 8/1965 | Howell | 135—27 |

OTHER REFERENCES

Shigeno et al.: Chemical Abstracts, vol. 53, column 9696g, May-June 1959.

WINSTON A. DOUGLAS, *Primary Examiner.*

B. J. OHLENDORF, *Assistant Examiner.*